United States Patent [19]
Zagar et al.

[11] Patent Number: 5,888,033
[45] Date of Patent: Mar. 30, 1999

[54] PRECISION QUILL-FEED UNIT

[75] Inventors: Frank G. Zagar, Willoughby; John F. Zagar, Mentor; Robert W. Jewell, Mayfield Village; Thomas Lingafelter, Mentor, all of Ohio

[73] Assignee: Zagar, Inc., Cleveland, Ohio

[21] Appl. No.: 947,701

[22] Filed: Oct. 9, 1997

[51] Int. Cl.$^6$ .................................................. B23B 39/00
[52] U.S. Cl. ............................................. 408/14; 408/124
[58] Field of Search ............................... 408/14, 17, 124, 408/130, 141, 241 S

[56] References Cited

U.S. PATENT DOCUMENTS

| | | | |
|---|---|---|---|
| 4,123,187 | 10/1978 | Turner | 408/17 |
| 4,371,297 | 2/1983 | Hirose | 408/17 |
| 4,421,441 | 12/1983 | Hirose | 408/17 |

FOREIGN PATENT DOCUMENTS

| | | | |
|---|---|---|---|
| 1011758 | 12/1965 | United Kingdom | 408/14 |

OTHER PUBLICATIONS

"Innovative Precision Gearing Works with Standard Screw", Catalog SG–02, pp. 1–20, Dynamic Automation, Inc., dated prior to Apr. 1, 1997.

*Primary Examiner*—Daniel W. Howell
*Attorney, Agent, or Firm*—Pearne, Gordon, McCoy & Granger LLP

[57] ABSTRACT

A self-contained precision quill-feed unit is provided with a positive stop arrangement to control depth of tool feed. The stop position is adjustable from the exterior of the unit and the stop abutments associated with moving and stationary members are positioned in such manner that no yawing forces are imposed on the quill, drive shaft and spindle of the unit. Additionally, yawing forces generated by the mechanical resistance of a known type of hydraulic constant velocity control (CVC) cylinder are opposed by reaction forces associated with the anti-rotation linkage that prevents rotation of the quill. Together these features provide overall a machine in which quill, drive shaft and spindle deflection or yawing is minimized or prevented.

11 Claims, 4 Drawing Sheets

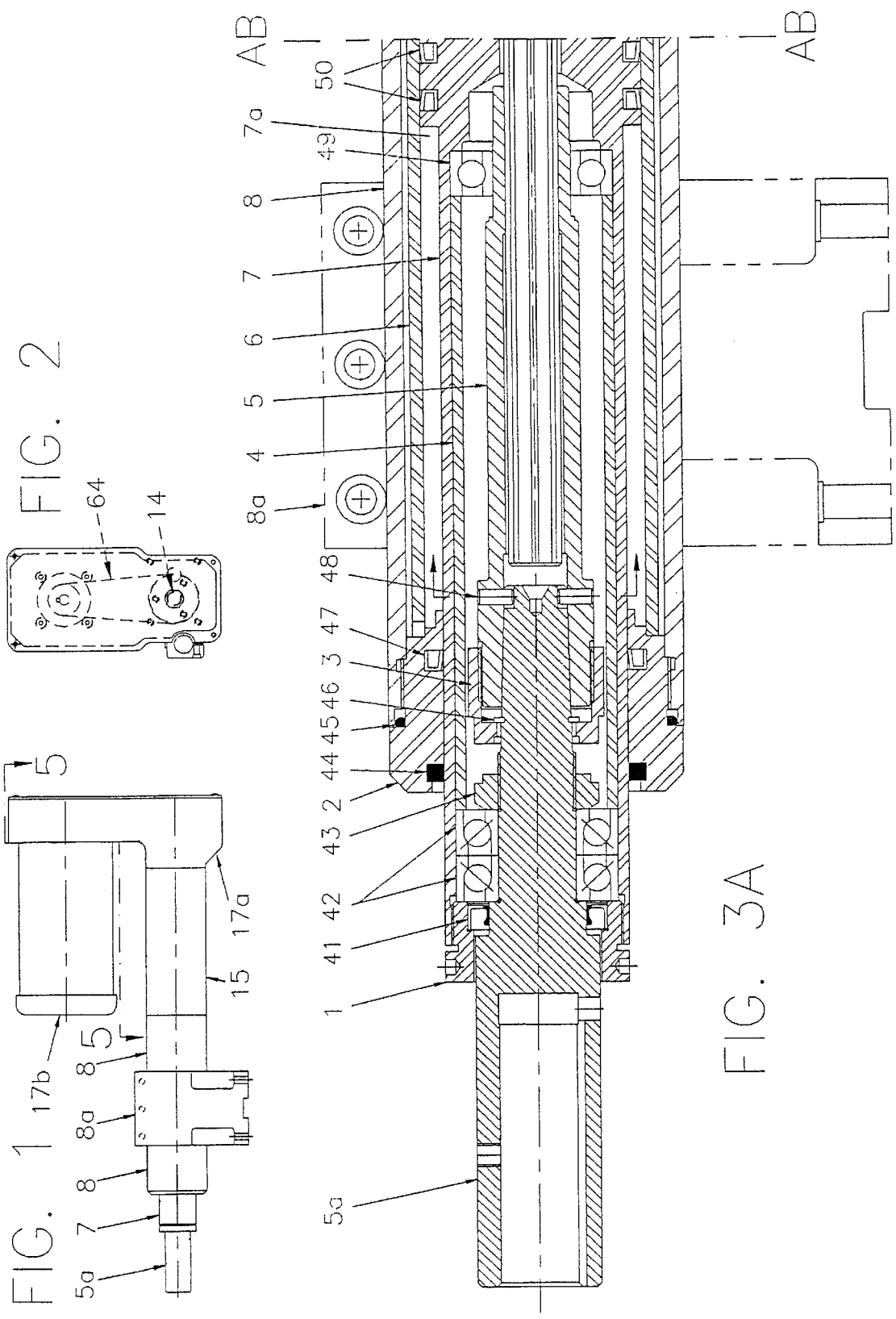

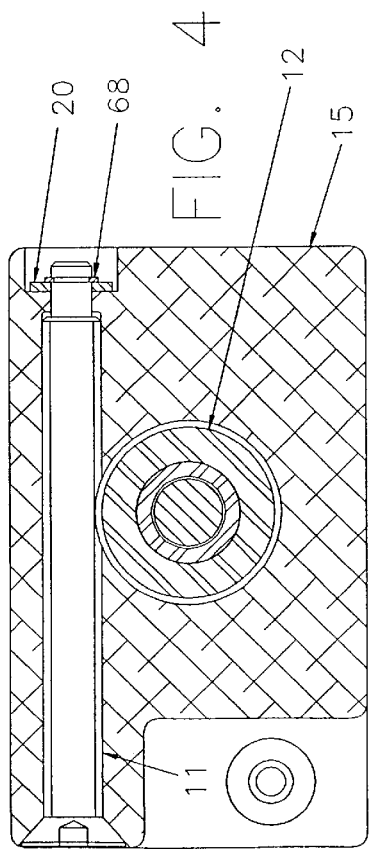
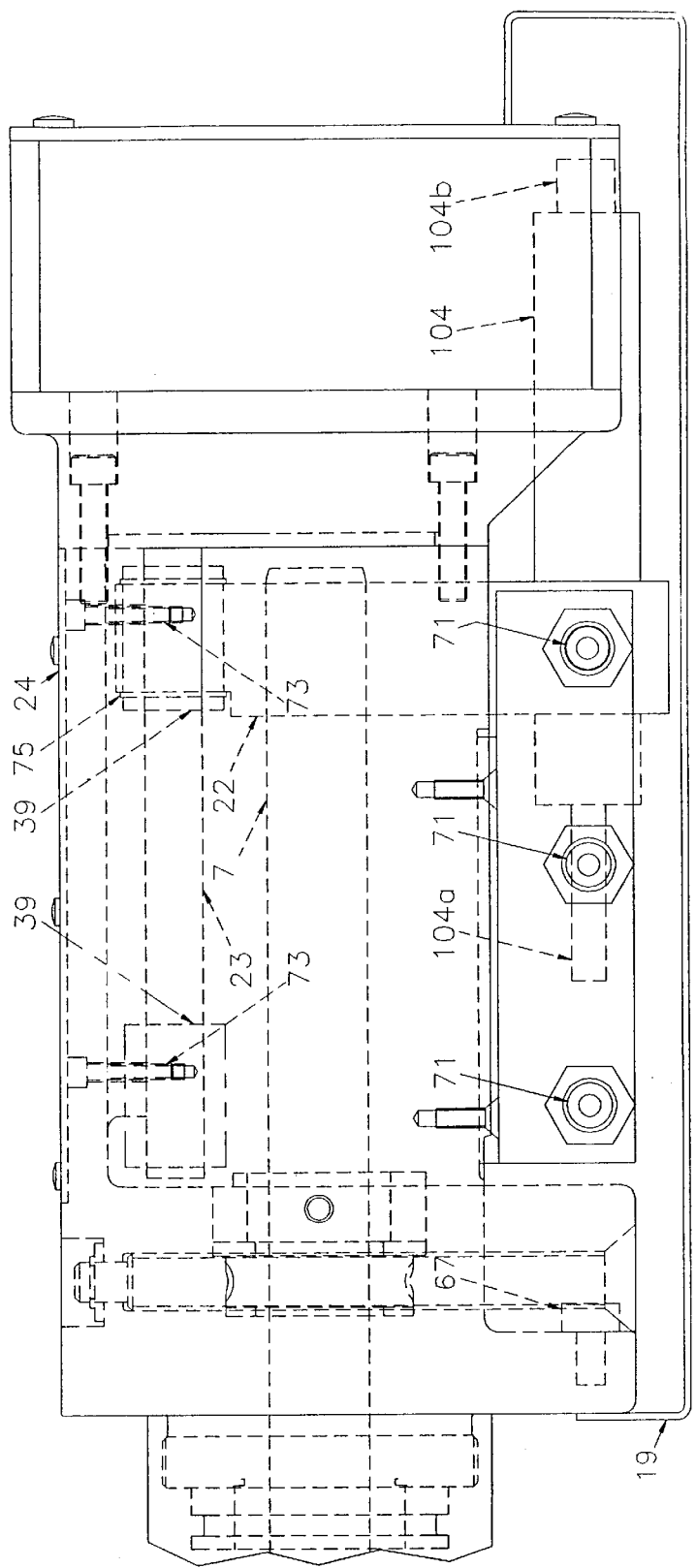

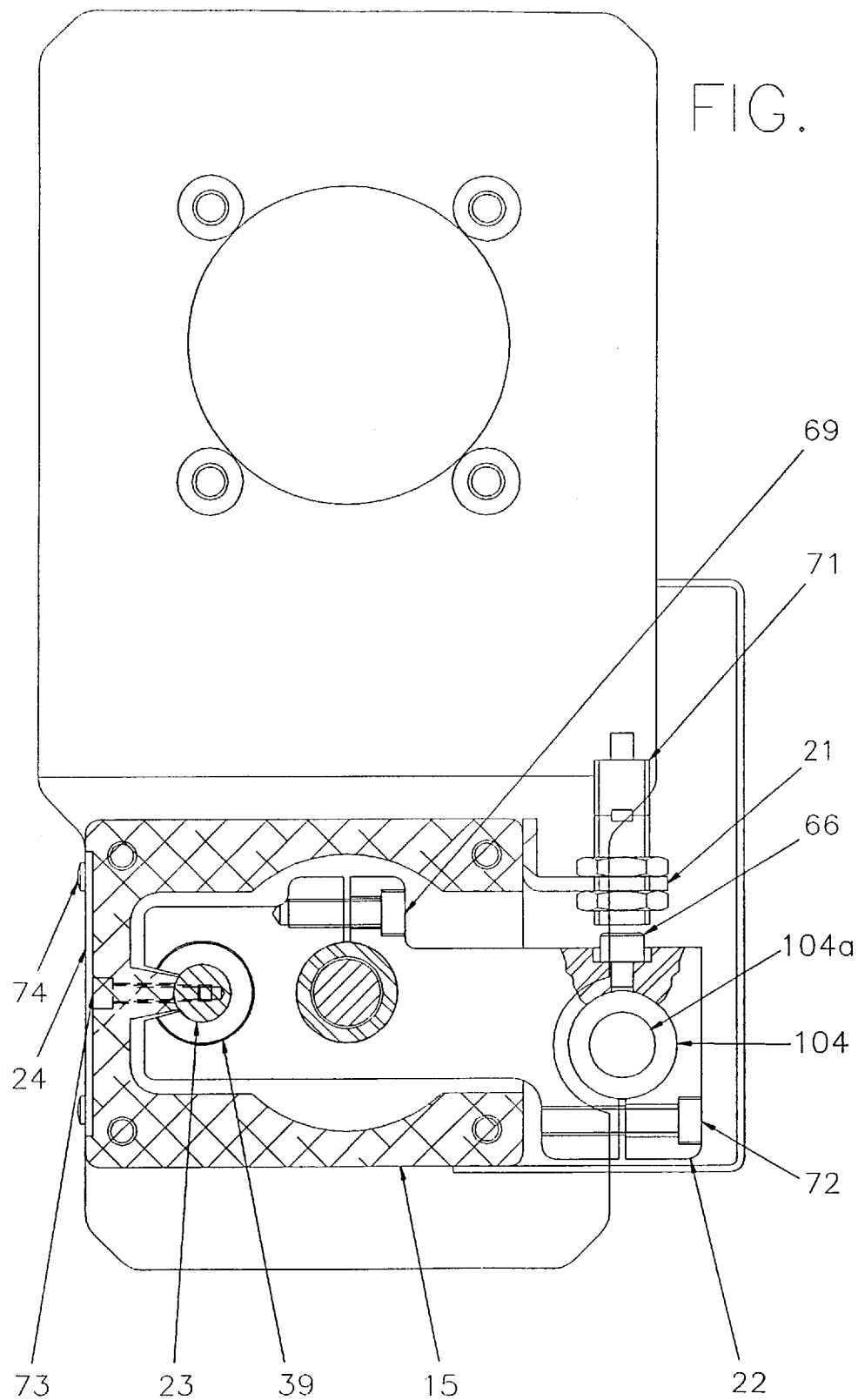

PRECISION QUILL-FEED UNIT

FIELD OF THE INVENTION.

The present invention relates to machine tools and particularly to precision quill-feed units for drills or other end-cutting tools, for drilling and reaming and the like.

BACKGROUND OF THE INVENTION

Precision quill-feed units generally comprise a package including a housing and three coaxial elements: a splined drive shaft, a non-rotating but axially moving quill, and a spindle splined to the output end of the drive shaft and coupled for axial movement with the quill while free to rotate relatively to the quill. The quill is restrained against rotation by a suitable anti-rotation guidance between the axially moving quill and the stationary housing. The package also includes a motor to power the rotation of the shaft and spindle, a pneumatic or hydraulic actuating means for advancing and retracting the quill and spindle, and associated parts and controls.

Loads Related to Adjustable Positive Stops.

It is known to control the full limit of advance of the quill by positive stop members, including a moving abutment associated with and moving with the axially moving quill and a fixed abutment engageable by the moving abutment near the full limit of advance. The abutments are adjustable with respect to each other, so that the limit of advance may be changed as required. When engagement between the abutments occurs to thereby stop the feed advance, such engagement is laterally offset from the common axis; the stop abutments cannot be physically located at the common axis of the quill, drive shaft and spindle. The lateral offsetting imposes pitch or yaw forces on the quill and the parts that are coaxial with the quill. The more such engagement is laterally offset from the common axis, the greater such pitch or yaw forces, other factors being equal. Such forces tend to misposition the tool carried by the spindle and to cause wear of bearings associated with the quill, drive shaft and spindle.

Loads Caused by Constant Velocity Controls.

At the beginning of a feed stroke, the advance of a drill or other tool mounted on the spindle is usually intended to be relatively rapid, and may be unconstrained other than by the flow capacity and other characteristics of the actuator powering the advance, or by a suitable flow controller. However, during the subsequent working portion of the feed stroke, the stroke velocity needs to be slower and closely controlled. To accomplish this, it is known practice to use a constant velocity control ("CVC") unit to (1) reduce the rate of advance of the drill or other tool at the start of the working portion of the feed stroke, and then (2) closely control the constant-rate advance of the tool at the reduced rate throughout the working portion of the feed stroke. Such CVC units are hydraulic devices comprising a rod-and-cylinder linkage mounted axially parallel to, and carried by and moving with, the axially moving quill. Associated with the cylinder of the device is a hydraulic flow-limiter which limits the rate of retraction of the rod into the cylinder, thereby limiting the rate of advance of the quill. This restraint starts when the rod engages a fixed rod-stop at the beginning of the working portion of the feed stroke, whereby the rod is forced by the continuing advance of the quill to retract into the cylinder.

The rod-and-cylinder linkage of the traditional CVC cannot physically be coaxial with the common axis of the shaft, quill and spindle. Since the rod of the CVC must therefore be offset from the common axis, the axial compressive force imposed on the rod, as it engages the fixed rod-stop and is then forced to retract into the cylinder, tends to contribute to yawing forces imposed on the quill, drive shaft and spindle.

Brief Description of the Invention

Loads Related to Adjustable Positive Stops.

According to the present invention, the limit of feed advance is controlled by providing moving and stationary stop abutments that, when they engage, impose substantially no pitch or yaw forces on the quill. The adjustable positive stop afforded by these abutments is of simple and economical construction, and may be finely adjusted. Furthermore, such fine adjustment may be conveniently accomplished from the exterior of the unit.

Loads caused by constant velocity controls.

According to the present invention, the yawing force that tends to be imposed by the compressive loading of the rod of the CVC is strongly resisted by elements associated with the anti-rotation sliding engagement between the stationary housing and the axially moving quill, thereby preventing or minimizing quill deflection or yawing. This is done by including restraints, or improved restraints, against yawing motion, as well as restraints against rotation, at the axially extending locus along which an element associated with the stationary housing guide is engaged by an element associated with the axially moving quill as the feed advances. These restraints are preferably in the form of a hardened shaft associated with the stationary housing guide and a ball bushing bearing associated with the axially moving quill.

The features described above provide in a simple manner improved constancy of axial alignment of the spindle and associated elements throughout the working portion of the feed stroke by reducing or eliminating spindle deflection, and accompanying wear and tool mispositioning, as compared to similar machines lacking such features but made of the same materials and to the same dimensions of drive shaft, quill and spindle.

The invention will be more fully understood from the Detailed Description of the Invention set forth below together with drawings.

BRIEF DESCRIPTION OF THE DRAWINGS

In the drawings:

FIG. 1 a semi-diagrammatic side elevation of a quill feed unit embodying ther invention, but omitting, for simplicity of illustration, Pertain mechanical elements that would otherwise appear at the side of housing 15 that is remote from motor 17b.

FIG. 2 is an elevation of the back end of the unit seen in FIG. 1, including end view of some of the elements omitted in FIG. 1.

FIG. 3A is side view of the front half of the structure seen in FIG. 1, taken in cross-section and on a larger scale.

FIGS. 3A and 3B when joined at lines AB—AB constitute an inclusive side elevation view of the entire length of the unit.

FIG. 4 is a cross-section taken on line 4—4 in FIG. 3B.

FIG. 5 is a plan view taken from line 5—5 in FIG. 1 but on the same scale as FIGS. 3A, 3B and 4 and with some elements omitted for clarity.

FIG. 6 is an elevation view taken on line 6—6 in FIG. 3B, partly broken away and partly in cross-section.

DETAILED DESCRIPTION OF THE INVENTION

Figure 3B:
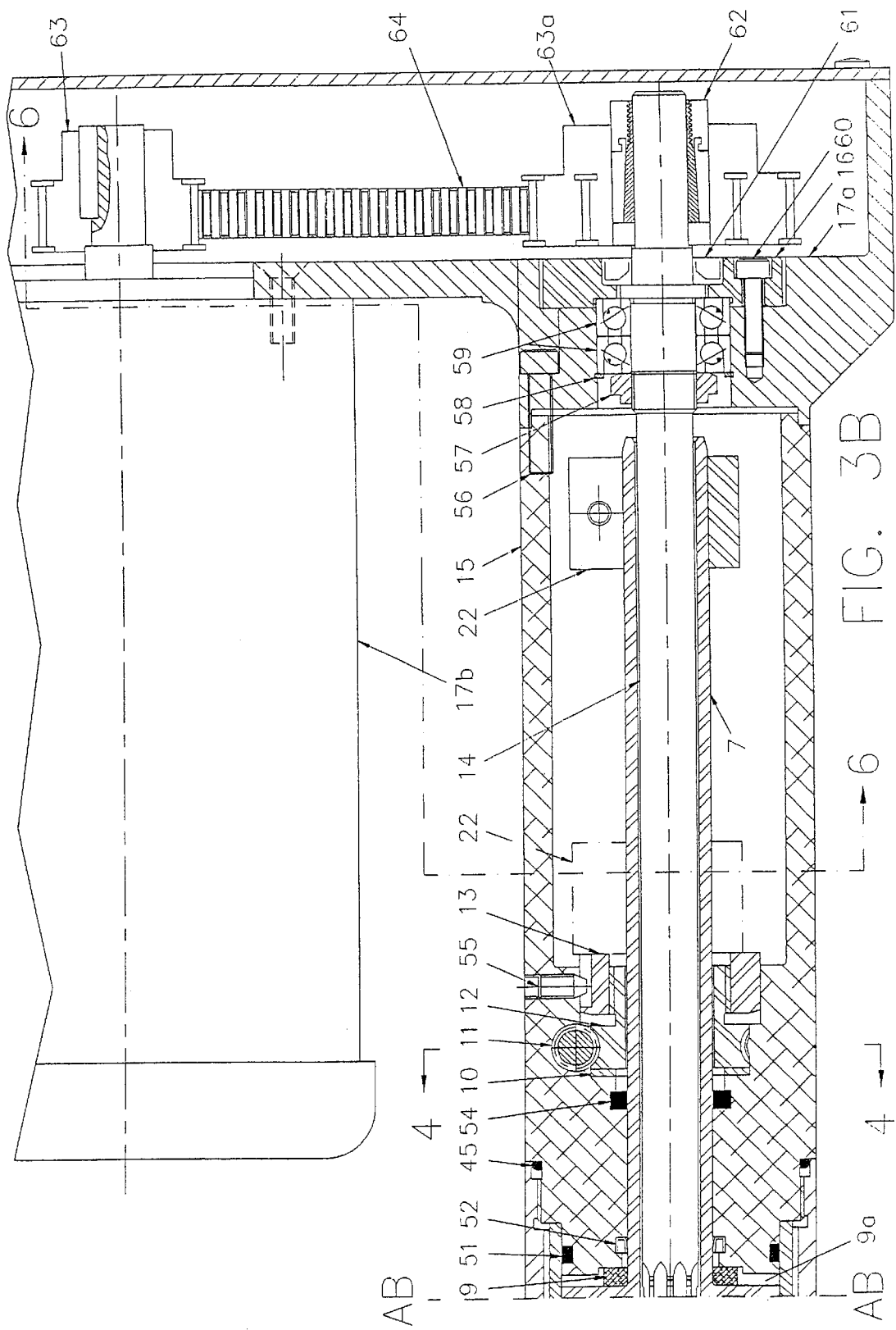
FIG. 3B is a side view of the rear half of the structure seen in FIG. 1, partly broken away and taken mostly in cross-section.

Referring to FIGS. 1 and 2, the illustrated unit comprises a generally rectilinear housing body 15, with a front extension in the form of a housing outer cylinder 8 threaded to the front end of the body 15. Received within the housing is a drive shaft 14 splined at its power output end. The drive shaft is powered by a motor 17b via a gear belt 64.

A non-rotating quill 7 coaxially surrounds the drive shaft 14 and is slidably received in the portion of the housing that is in the region of the spindle body 5 for axial movement in advancing and retracting directions. A spindle whose outer end 5a may be seen in FIG. 1 is coaxial with the drive shaft and quill. The spindle is splined to and driven rotatably by the drive shaft but is movable axially relative to the drive shaft. The spindle is coupled to the quill for reciprocating movement therewith via a radial bearing 49 and a pair of radial-thrust bearings 42. The spindle is driven axially in advancing and retracting directions by the quill but is rotatable with respect to the quill. In summary and in accordance with well known practice, torque is transmitted to the spindle by the drive shaft at all longitudinal positions of the spindle and quill, and thrust is transmitted to the spindle by the quill at all rotative positions of the spindle and shaft.

The barrel or outer cylinder 8 is received in the collar of a barrel mount or bracket 8a (FIG. 1) which in turn is bolted or otherwise fastened to a mounting surface (not shown). Other mounting arrangements may by used to provide positioning of the unit so that it is aimed up or down at any desired angle; for example a column mount (not shown) may be employed wherein the barrel 8 is collared in a bracket which can be set at any desired swivelled position relative to a second collar adjustable received on a stationary vertical column whose pedestal is bolted to the mounting surface.

The structure of the unit is shown in much greater detail in FIGS. 3A, 3B, and 4–6. In the particular unit illustrated, the spindle end 5a is not integral with the spindle body 5, but is connected thereto by dowel pins 48. The internal spindle nut 3 engages the spindle end 5a via the retaining ring 46. This allows for rapid replacement of the spindle end without the need for replacement of the splined portion of the spindle 5 and also allows for spindle end diameters larger than the inner diameter of the radial thrust bearings 42, but such feature forms no part of the present invention.

In the illustrated unit, the power input end of the drive shaft 14 is supported by ball bearings 59 mounted in the rear housing 17a and retained by retaining ring 58, lock nut 57, and retainer block 16 which is secured by socket head screws 60. An oil seal 61 is positioned within the retainer block. The rear belt 64 and the pulleys 63 and 63a form a drive train between the motor 17b and the drive shaft. The pulley 63a is connected to the drive shaft via a coupling 62, such as the illustrated "Fenner Manheim, Transtorq Fastener #6202740."

As seen in FIG. 3A, a fixed inner cylinder 6 is mounted in fixed coaxial association with the housing outer cylinder or barrel 8 and housing body 15, and an o-ring seal 51 is provided between body 15 and the cylinder 6. Cylinder 6 slidingly receives the major diameter portion of the quill 7. Appropriate U-packings or seals 50 are provided in such major diameter portion. The rearward wall of such major diameter portion abuts an annular cushion 9 when the quill and spindle are fully retracted as shown in the drawings.

The cylindrical forward and intermediate portions of the quill 7 are slidingly received in the end cap 2 which is threadedly mounted at the spindle end of the housing outer barrel 8. A suitable o-ring seal 45 is provided between the end cap 2 and the barrel 8. A suitable rod wiper 44 is provided between the end cap 2 and the forward or intermediate portion of the quill, and a u-packing 47 is also provided between these same parts.

The small-diameter rear end or "tail" of the quill 7 surrounds the drive shaft 14 and is slidingly received by the housing body 15. A suitable rod wiper 54 is provided between the housing body 15 and the tail of the quill, and a u-packing 52 is also provided between these same parts.

Compressed air is fed to and exhausted from ports (not shown) associated respectively with the annular chamber 9a surrounding the cushion 9 and the annular chamber or space between the housing outer cylinder or barrel 8 and the inner cylinder 6. The latter chamber or space communicates at the front end of cylinder 6 with the annular space 7a between the inner cylinder 6 and the quill 7. Compressed air is fed into chamber 9a (FIG. 3B) to axially advance the quill and spindle, and is fed into chamber 7a to retract the same parts. In either case, the chamber not receiving air is ported to an exhaust line or port by a valving arrangement (not shown).

As previously described, axial thrust is imparted to the spindle from the quill via the pair of radial-thrust bearings 42. The bearings 42 are retained by an external spindle nut 1 and lock nut 43. The bearing 49 is retained by spacer sleeve 4. An oil seal 41 is provided between spindle nut 1 and spindle end 5a. An internal spindle nut 3 threadedly connects the internally splined spindle body 5 and the exchangeable spindle end 5a, and locks them together against relative axial movement. The same members are also connected by a pair of dowel pins 48, locking them together against relative rotation.

The external spindle nut 1 may be disengaged, the spindle end 5a and body 5 pulled outwardly, and the internal spindle nut disengaged to allow replacement of the spindle end 5a with another end of different configuration. When tightened, the internal spindle nut 3 engages the spindle end 5a via the retaining ring 46.

In blind hole drilling or facing operations, it is often important to precisely define the depth of drilling by providing an adjustable positive stop to thereby accurately determine and control the point of furthest advance of a drill mounted on the spindle. In general, this is done by providing a moving abutment associated with the axially moving quill and a fixed abutment engageable by the moving abutment. The abutments are adjustable with respect to each other, so that the limit of advance and therefore the depth of drilling may be changed as required. However, the stop abutments cannot be physically located at the common axis of the quill, drive shaft and spindle, and therefore when engagement between the abutments occurs to thereby stop the feed advance, such engagement has generally been laterally offset from the common axis, for example between a flat face and the end of a set screw aimed axially along the machine and provided with a lock nut to hold it in adjusted position. The lateral offsetting imposes pitch or yaw forces on the quill and the parts that are coaxial with the quill. The more such engagement is laterally offset from the common axis, the greater such pitch or yaw forces, other factors being equal. Such forces tend to misposition the tool carried by the spindle and to cause wear of bearings associated with the quill, drive shaft and spindle.

Set screw stop arrangements are also inconvenient to adjust because of their relatively inaccessible locations and the difficulty of arriving at a desired fine adjustment without some trial and error because of possible slight changes in screw position as the lock nut is tightened.

According to the present invention, the feed advance limit is controlled by providing moving and stationary stop abutments that, when they engage, impose substantially no pitch or yaw forces on the quill. The adjustable positive stop afforded by these abutments is of simple and economical construction, and may be finely adjusted without trial and error. Furthermore, such fine adjustment may be conveniently accomplished from the exterior of the unit.

In the present invention, a positive stop is provided in the form of a hubbed worm gear 12 which is mounted in the housing 15 as best seen in FIGS. 3B and 4. Preferably, the worm gear is not piloted on the quill and, as shown, there is a slight clearance between the hub of the worm gear and the quill; instead the worm gear is piloted in the housing by the illustrated small cylindrical shoulders at the worm gear's outside diameter, with the worm gear's threaded engagement with an adjusting nut 13, to be further referred to below, acting as a piloting guide. The worm gear 12 is retained against rearward axial movement away from the spacer washer 10 by the interference in the axial direction between the worm shaft 11 and the worm gear 12, such interference being seen in FIG. 3B. The spacer washer 10 (in addition to the just-mentioned interference) constrains the worm gear against forward axial movement. This minimizes or eliminates any tendency of the quill to drag the hubbed gear with it when the quill advances or retracts, and eliminates any need to provide for installation of a retainer such as a snap ring or the like to resist such dragging when the quill retracts.

However the worm gear is piloted, it is mounted for relative longitudinal (axial) and rotational movement relative to the quill. The worm gear is meshed with a worm shaft or drive 11 carried in the housing 15. The worm shaft 11 is retained by a spacer 20 and snap ring 68, and provided with a socket head at an exterior side of the housing. The worm gear is supported against the housing body 15 by a spacer washer 10.

The adjusting nut 13 is threaded on the hub of the worm gear 12. The rearwardly facing end face of this nut surrounds the quill and provides the stationary stop abutment. A set screw 55 cooperates with the illustrated groove in the nut to hold the nut against rotation while allowing axial movement of the nut relative to the housing body 15.

The moving stop abutment moves with the quill and in the illustrated machine is provided by that portion of the forwardly facing side of the bracket 22 which contacts the end face of the adjusting nut to positively stop the advance, as indicated in phantom in FIG. 3B. Such portion of the forwardly facing side of the bracket 22 constitutes the moving member of the pair of stop abutments, and surrounds the quill and moves with it. A socket head screw 69 clamps the bracket 22 on or near the rear end of the rear stem portion of the quill.

It will be seen that when the moving and fixed stop abutments engage, they do so at points of engagement that are balanced on opposite sides of the quill. Bending moments imposed on the bracket 22 substantially balance out and substantially no pitch or yaw forces are imposed on the quill. Preferably, as in the illustrated embodiment, the faces forming the fixed and moving abutments (the end face of the adjusting nut 13 and the facing side of the bracket 22) are annularly continuous (uninterrupted by notches or the like) so that their area of engagement surrounds the quill.

The worm shaft and worm gear may be finely pitched to give a fine adjustment to the rotative position of the worm gear, and a second order of fineness is imparted by the mechanical reduction of the rotative adjustment of the worm gear to the axial adjustment of the adjusting nut effected by the threaded connection between them. This fine, self-locking adjustment is readily accomplished by turning the socket head of the worm shaft or drive 11 with an Allen wrench or the like. The socket head is easily accessible to manipulation from the exterior of the housing 15.

A primary purpose of the bracket 22 is to support a cylindrical constant velocity control (CVC) or hydraulic feed control 104. Such controls are well known and are available from several manufacturers. The CVC cylinder is clamped in the bracket 22 by a socket head screw 72. A rod 104a extends from the forward end of the CVC cylinder, and is shown in its fully extended position in FIG. 5. As the quill, bracket and CVC advance, the rod advances with them until it contacts the fixed rest button 67 carried on the housing 15. Thereafter, the rod is forced into the cylinder at a rate governed by the setting of a hydraulic bleed or bypass within the cylinder (not shown), such setting being by means of an external knob 104b. This retraction of the rod in turn limits and thereby governs the rate of advance of the quill and spindle as the tool completes its advance, the governed rate being slower than the rate of free advance of the quill under pneumatic pressure when unrestrained by the rod 104a. In this manner, the stroke of the quill is divided into a fast-feed portion before the rod starts to retract and a slower velocity-controlled working portion after the rod starts to retract.

In accordance with known practice, proximity sensors 71 may be carried on the housing 15 by suitable brackets, each sensor being adapted to sense when it is positioned at a feature moving with the bracket, such as the rest button 66 shown in the drawings. The sensors are used to control the pneumatic and hydraulic circuits (not shown) associated with the feed and retraction of the quill and spindle, with the re-extension of the rod 104a upon the retraction of the quill and spindle, and (in the case of the intermediate proximity sensor) with "pecking" feed control of the quill and spindle when required in deep drilling in order to clear chips as drilling progresses. Control arrangements of such type are well known, and accordingly the controls associated with the proximity sensors will not be described in detail since they form no part of the present invention.

The rod-and-cylinder linkage of the CVC, as just described, cannot physically be coaxial with the common axis of the shaft, quill and spindle. Since the rod of the CVC must therefore be offset from the common axis, the axial compressive force imposed on the rod, as it engages the fixed rod-stop or rest button 67 or the like, and is then forced to retract into the cylinder, tends to contribute to yawing forces imposed on the quill, drive shaft and spindle.

In known quill-feed units of the type to which the invention relates, the quill is held against rotation by a anti-rotation pin or follower fixed thereto, as by a bracket. The pin is arranged to slidingly engage an axially extending slot, groove or face in the unit housing to thereby provide an anti-rotation pin-and-slot type sliding engagement to prevent rotation while accommodating the relative sliding motion between the quill and the housing.

According to the present invention, the yawing force that tends to be imposed by the compressive loading of the rod of the CVC is strongly resisted by elements associated with the anti-rotation sliding engagement between the stationary housing and the axially moving quill, thereby preventing or minimizing quill deflection or yawing. This is done by including restraints, or improved restraints, against yawing motion, as well as restraints against rotation, at the axially extending locus along which an element associated with the stationary housing guide is engaged by an element associated with the axially moving quill as the feed advances. These restraints are preferably in the form of a hardened shaft associated with the stationary housing guide and a ball bushing bearing associated with the axially moving quill.

Thus, in the illustrated apparatus, the constant velocity control (CVC) bracket 22 (FIGS. 3B, 5, 6) carries an open-sided bushing-type bearing at the bracket end opposite the end associated with the CVC. Presently it is preferred that this open-sided bearing be an open-sided ball bushing bearing such as the bearing 39 (FIGS. 5, 6). Bearings of this type are well known and are commercially available; in the illustrated apparatus, the bearing 39 is a Thomson "Super-Opn-8-DD". In the illustrated apparatus, the bearing 39 slides along a hardened shaft 23 received on a mounting or pillow formed as part of housing 15, as seen in FIG. 6. The shaft 23 is fixed to the housing pillow by socket head screws 73, which may be covered by a decorative nameplate 24. The bearing 39 is retained on the bracket 22 by retaining rings 75.

The CVC bracket 22 and the quill 7 are held against rotation by engagement of the bushing 39 with the shaft 23 in much the same manner as would a conventional pin-and-slot or similar sliding connection. Additionally, however, the engagement between the bushing and shaft provides reaction forces acting against yawing stresses imposed on the bracket 22 by engagement of the CVC rod 104a against the stop 67. The effect is to relieve yawing stress loads which would otherwise be imposed on the quill, thereby preventing or minimizing quill, drive shaft and spindle deflection or yawing related to the axial compressive force imposed on the rod 104a as it engages the fixed rod-stop or rest button 67 and is then forced under hydraulic resistance to retract into the CVC cylinder.

The use of both the coaxial positive stop arrangement associated with the adjusting nut 13 and the yaw-reactive bushing and shaft associated with the bracket end opposite the end associated with the CVC provides overall a machine in which quill, drive shaft and spindle deflection or yawing associated with either positive stop or hydraulic constant velocity control is minimized or prevented.

In the practice of the invention, modifications may be made which omit or modify elements described above, or add other elements. For example, other forms of brackets, housing, or other elements may be used. The spindle may not be constructed so as to provide replaceable ends. Obviously, many other features and details may be altered while utilizing the teachings of the above disclosure. The invention is not intended to be limited to the details described in the disclosure, but to be defined by the following claims.

What is claimed is:

1. In a quill-feed unit for feeding a drill or other end-cutting tool, a housing body, a rotatable drive shaft splined at its power output end, a non-rotating quill slidably received within the housing body for axial movement in advancing and retracting directions, said quill coaxially surrounding said rotatable drive shaft, a spindle coaxial with said quill and drive shaft and coupled for advancing and retracting movement with said quill and for rotation with said drive shaft, and adjustable stop means for determining the limit of said axial movement of said quill in said advancing direction, said stop means comprising a moving abutment associated with and moving with said axially moving quill and a fixed abutment engageable by said moving abutment, the improvement comprising a hubbed worm gear mounted in the housing body coaxially with said quill for relative longitudinal and rotational movement with respect thereto, said worm gear being meshed with a worm drive mounted on said housing body and turnable from the exterior of said housing body, a nut threadedly engaged on the hub of said worm gear, and means restraining said nut against rotation while allowing axial movement thereof relative to said housing body, said fixed abutment having portions at opposite sides of the axis of said quill and comprising an end face of said nut, said moving abutment presenting a moving abutment face moving with said quill and having portions on opposite sides of the axis of said quill, said fixed and moving abutments engaging at points of engagement that are balanced on opposite sides of the axis of said quill.

2. A device as in claim 1, said fixed and moving abutments engaging at an area of engagement that surrounds the quill.

3. A device as in claim 1, said worm gear being free of contact with said quill and having cylindrical shoulders at its outside diameter, said shoulders piloting said worm gear in its turning motion in the housing body, said threaded engagement between said nut and the hub of said worm gear acting as a piloting guide.

4. A device as in claim 1, said means restraining said nut against rotation comprising a set screw carried by said housing body and a cooperating groove formed in said nut.

5. In a quill-feed unit for feeding a drill or other end-cutting tool, a housing body, a rotatable drive shaft splined at its power output end, a non-rotatable quill slidably received within the housing body for axial movement in advancing and retracting directions, said quill coaxially surrounding said rotatable drive shaft, stop means for determining the limit of said axial movement of said quill in said advancing direction, anti-rotation guide means for accommodating axial movement of said quill while preventing it from rotation, said guide means including a guide element mounted at a first end of a transversely extending bracket which is centrally fixed to said axially moving quill for movement therewith, a rod-and-cylinder linkage mounted on said bracket at the other or second end thereof and on the other side of said quill from said guide element, said rod-and-cylinder linkage being mounted axially parallel to said quill and moving with said axially moving quill, hydraulic flow limiting means associated with the cylinder of said rod-and-cylinder linkage, said rod-and-cylinder linkage being adapted to restrain the rate of movement of the quill toward the end of its advance by contact of the end of the rod of said rod-and-cylinder linkage with a fixed member whereby said rod is forced by the continuing advance of said quill to retract into the cylinder of said rod-and-cylinder linkage but only at a rate allowed by said hydraulic flow limiting means, the improvement which comprises a combined anti-rotation and anti-yaw bushing-and-shaft guide associated with said first end of said bracket, said guide including an open-sided bushing-type bearing on said first end of said bracket and a fixed shaft along which said bearing slides to both restrain said bracket and quill from rotation and generate reaction forces to yawing stresses imposed on the bracket and quill by engagement of said rod with said fixed member, whereby said reaction forces relieve yawing stress loads which would otherwise be imposed on the quill, thereby reducing or eliminating quill and spindle deflection or yawing related to the axial compressive force imposed on said rod as it engages said fixed member and is then forced under hydraulic resistance to retract into the CVC cylinder.

6. In a quill-feed unit for feeding a drill or other end-cutting tool, a housing body, a rotatable drive shaft splined at its power output end, a non-rotatable quill slidably received within the housing body for axial movement in advancing and retracting directions, said quill coaxially surrounding said drive shaft, a spindle coaxial with said drive shaft and quill, said spindle being splined to and driven rotatably by said drive shaft, said spindle being rotatable with respect to said quill and being driven axially in said advancing and retracting directions by said quill, a stop for determining the limit of said axial movement of said quill and spindle in said advancing direction, said stop comprising a moving abutment associated with and moving with said axially moving quill and an axially adjustable fixed abutment carried by said housing body and engageable by said moving abutment at points of engagement that are balanced on opposite sides of the axis of said quill to thereby determine said limit of said advancing axial movement of said quill and spindle without imposing pitching or yawing loads on said quill, a transversely extending bracket fixed to said axially moving quill for movement therewith, a rod-and-cylinder linkage mounted at one end of the bracket, said rod-and-cylinder linkage being mounted axially parallel to said quill and moving with said axially moving quill, hydraulic flow limiting means associated with the cylinder of said rod-and-cylinder linkage, said rod-and-cylinder linkage being adapted to restrain the rate of movement of the quill toward the end of its advance by engagement of the end of the rod of said rod-and-cylinder linkage with a fixed rod-stop or whereby said rod is forced by the continuing advance of said quill to retract into the cylinder of said rod-and-cylinder linkage but only at a rate allowed by said hydraulic flow limiting means, said engagement with the fixed rod-stop imposing yawing stresses on the quill via the bracket, an open-sided bushing-type bearing at the other end of said bracket and on the other side of the quill from said rod-and-cylinder linkage, a fixed shaft supported by said housing body and slidingly received in said bushing-type bearing, said bushing-type bearing engaging said fixed shaft along a portion of the length of said fixed shaft whereby said engagement not only prevents rotation of said quill with respect to said housing body while accommodating axial movement of said quill, but also resists said yawing stresses imposed on said quill by said axial loading imposed at the other end of said bracket.

7. A device as in claim 6, said fixed and moving abutments engaging at an area of engagement that surrounds the quill.

8. A device as in claim 6, a hubbed worm gear mounted in the housing body coaxially with said quill for relative longitudinal and rotational movement with respect thereto, said worm gear being meshed with a worm drive mounted on said housing body and turnable from the exterior of said housing body, a nut threadedly engaged on the hub of said worm gear, and means restraining said nut against rotation while allowing axial movement thereof relative to said housing body, said fixed abutment having portions at opposite sides of the axis of said quill and comprising an end face of said nut.

9. A device as in claim 8, said moving abutment comprising an abutment face associated with and moving with said transversely extending bracket.

10. A device as in claim 8, said means restraining said nut against rotation comprising a set screw carried by said housing body and a cooperating groove formed in said nut.

11. A device as in claim 8, said worm gear being free of contact with said quill and having cylindrical shoulders at its outside diameter, said shoulders piloting said worm gear in its turning motion in the housing body, said threaded engagement between said nut and the hub of said worm gear acting as a piloting guide.

\* \* \* \* \*